(12) United States Patent
Yamamoto (10) Patent No.: US 10,960,534 B2
(45) Date of Patent: Mar. 30, 2021

(54) ROBOT AND PARALLEL LINK ROBOT (71) Applicant: FANUC CORPORATION, Yamanashi (JP)

(72) Inventor: Masahiro Yamamoto, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 38 days.

(21) Appl. No.: 16/035,926

(22) Filed: Jul. 16, 2018

(65) Prior Publication Data
US 2019/0061144 A1 Feb. 28, 2019

(30) Foreign Application Priority Data
Aug. 23, 2017 (JP) .............. JP2017-160339

(51) Int. Cl.
B25J 9/00 (2006.01)
B25J 18/00 (2006.01)
B25J 17/02 (2006.01)
B25J 19/00 (2006.01)

(52) U.S. Cl.
CPC ........... *B25J 9/0012* (2013.01); *B25J 9/0018* (2013.01); *B25J 9/0051* (2013.01); *B25J 17/0275* (2013.01); *B25J 18/00* (2013.01); *B25J 19/0029* (2013.01)

(58) Field of Classification Search
CPC .................................................. B25J 9/0012
See application file for complete search history.

(56) References Cited

U.S. PATENT DOCUMENTS

| 5,061,533 A * | 10/1991 | Gomi ................. B29D 99/0035 |
| | | 428/110 |
| 5,172,877 A * | 12/1992 | Hattori ................... F16L 3/123 |
| | | 248/68.1 |
| 5,744,728 A * | 4/1998 | Suita ...................... B25J 19/063 |
| | | 73/862.542 |
| 2010/0005919 A1 | 1/2010 | Breu |
| 2011/0033275 A1 | 2/2011 | Lehmann |
| 2011/0097184 A1* | 4/2011 | Kinoshita ............ B25J 17/0266 |
| | | 414/589 |

(Continued)

FOREIGN PATENT DOCUMENTS

| CN | 102049776 A | 5/2011 |
| CN | 103802094 A | 5/2014 |

(Continued)

OTHER PUBLICATIONS

Office Action dated Jun. 25, 2019, in corresponding Japanese Application No. 2017-160339; 6 pages.

(Continued)

*Primary Examiner* — William Kelleher
*Assistant Examiner* — Gregory T Prather
(74) *Attorney, Agent, or Firm* — Maier & Maier, PLLC (57) ABSTRACT

Provided is a robot including at least one joint, and at least two links and coupled with each other by the joint. At least one of the links and includes an inner layer made of carbon fiber reinforced plastic, and an outer layer made of elastic material and covering an outer peripheral surface of at least part of the inner layer in a longitudinal direction over an entire circumference, the layers being integrally stacked.

8 Claims, 5 Drawing Sheets

(56) References Cited

U.S. PATENT DOCUMENTS

| | | | | |
|---|---|---|---|---|
| 2013/0057008 A1* | 3/2013 | Takemura | ............... | B25J 9/0012 294/213 |
| 2014/0014219 A1* | 1/2014 | Takemura | ............... | B25J 9/0012 138/140 |
| 2014/0360306 A1* | 12/2014 | Mihara | ................... | B25J 9/0051 74/490.02 |
| 2015/0040713 A1* | 2/2015 | Hirano | ................. | B25J 19/0029 74/490.02 |
| 2015/0125203 A1* | 5/2015 | Cho | ........................ | F16B 2/18 403/396 |

FOREIGN PATENT DOCUMENTS

| | | | | |
|---|---|---|---|---|
| CN | 103909517 A | | 7/2014 | |
| DE | 102007004379 A1 | | 7/2008 | |
| DE | 102008001314 A1 | | 10/2009 | |
| DE | 102010047315 B4 | | 5/2012 | |
| DE | 102011115980 | * | 4/2013 | ............. B25J 19/00 |
| DE | 102011115980 A1 | | 4/2013 | |
| DE | 10 2016 113 448 A1 | | 2/2017 | |
| EP | 0363887 A2 | | 4/1990 | |
| EP | 0689903 A1 | | 1/1996 | |
| EP | 2810744 A1 | | 12/2014 | |
| EP | 2835226 A1 | | 2/2015 | |
| GB | 2247731 A | | 3/1992 | |
| JP | 59-042208 A | | 3/1984 | |
| JP | H02-238930 A | | 9/1990 | |
| JP | H04-058687 U | | 5/1992 | |
| JP | H08-011085 A | | 1/1996 | |
| JP | H08-158628 A | | 6/1996 | |
| JP | H11-221788 A | | 8/1999 | |
| JP | 2005-199385 A | | 7/2005 | |
| JP | 2006-044264 A | | 2/2006 | |
| JP | 2009-190149 A | | 8/2009 | |
| JP | 2011-088262 A | | 5/2011 | |
| JP | 2012-161885 A | | 8/2012 | |
| JP | 2014-237187 A | | 12/2014 | |
| JP | 2015-033749 A | | 2/2015 | |
| JP | 2015-063150 A | | 4/2015 | |
| JP | 2015-524040 A | | 8/2015 | |

OTHER PUBLICATIONS

Search Report dated Jun. 26, 2019, in corresponding Japanese Application No. 2017-160339; 15 pages.

Chinese Office Action dated Dec. 6, 2019, in connection with corresponding CN Application No. 201810895760.1 (13 pgs., including machine-generated English translation).

Office Action dated Jun. 22, 2020 in corresponding German Application No. 10 2018 119 982.1; 20 pages including English-language translation.

* cited by examiner

ROBOT AND PARALLEL LINK ROBOT

CROSS-REFERENCE TO RELATED APPLICATIONS

This application is based on Japanese Patent Application No. 2017-160339, the contents of which are incorporated herein by reference.

FIELD

The present invention relates to a robot and a parallel link robot.

BACKGROUND

In a known technology (for example, PTL 1), a link connecting joints of a robot is made of carbon fiber reinforced plastic (CFRP). According to Japanese Unexamined Patent Application, Publication No. 2014-237187, the link is preferably formed of lightweight material such as CFRP.

SUMMARY

The present invention provides the following solutions.

A robot according to an aspect of the present invention includes at least one joint, and at least two links coupled with each other by the joint. At least one of the links includes an inner layer made of carbon fiber reinforced plastic, and an outer layer made of elastic material and covering an outer peripheral surface of at least part of the inner layer in a longitudinal direction over an entire circumference, the layers being integrally stacked.

A parallel link robot according to another aspect of the present invention includes: a foundation unit; a movable unit; a plurality of arms coupling the foundation unit and the movable unit in parallel; and a plurality of actuators disposed in the foundation unit and configured to drive the respective arms. Each arm includes a drive link driven by the actuator, and a passive link coupled with the drive link by a joint. Each passive link includes two link members parallel to each other. At least one of the link members includes an inner layer made of carbon fiber reinforced plastic, and an outer layer made of elastic material and covering an outer peripheral surface of at least part of the inner layer in a longitudinal direction over an entire circumference, the layers being integrally stacked.

DETAILED DESCRIPTION

The following describes a parallel link robot (robot) 1 according to an embodiment of the present invention with reference to the accompanying drawings.

Figure 1:
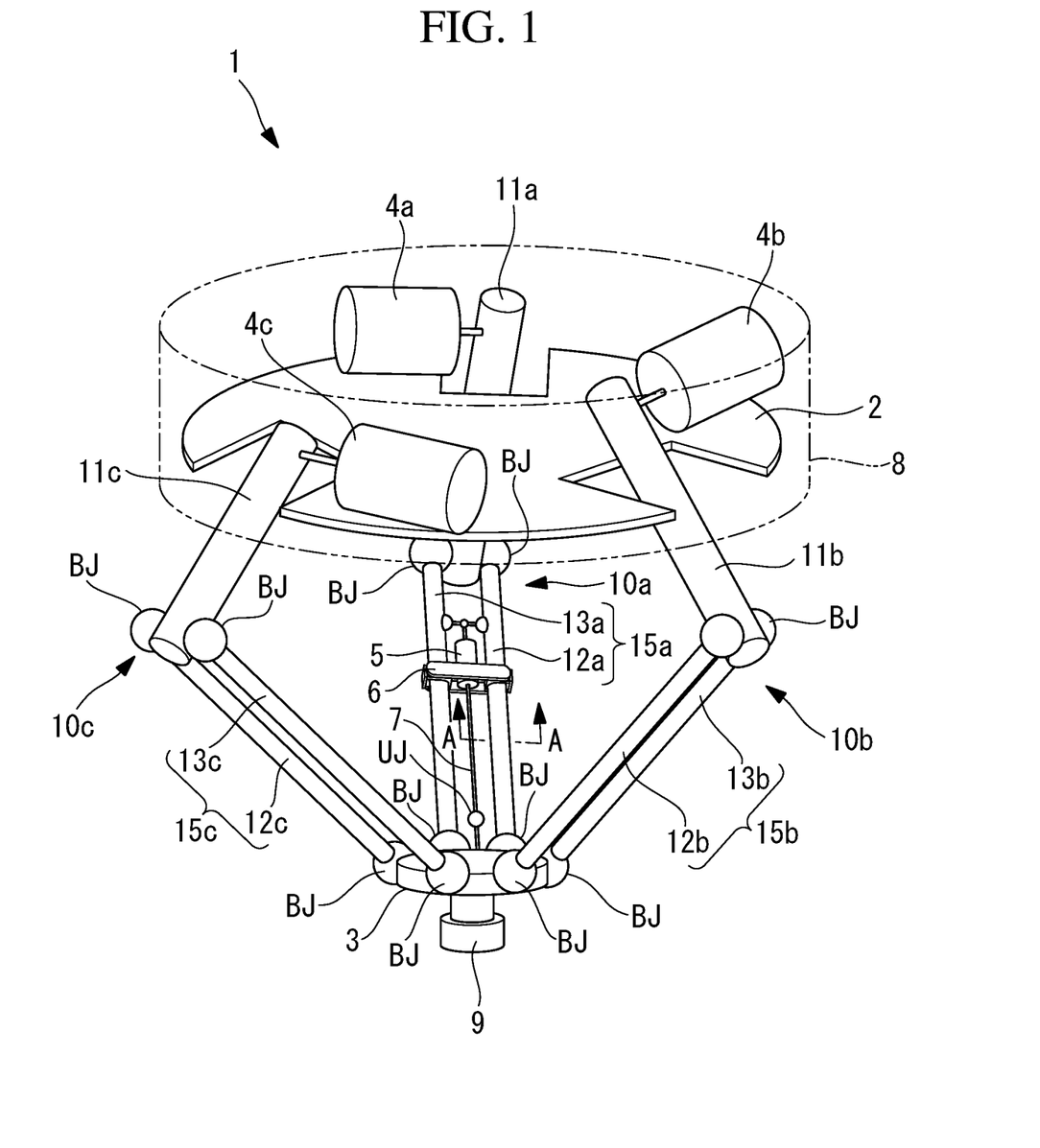
FIG. 1 is a perspective view illustrating a parallel link robot according to an embodiment of the present invention.

FIG. 1 is a perspective view illustrating a parallel link robot 1 according to the present embodiment. As illustrated in FIG. 1, the parallel link robot 1 includes a foundation unit 2 housed in a housing 8, a movable plate 3 (movable unit) having a circular disk shape, three arms 10a to 10c coupling the foundation unit 2 and the movable plate 3 in parallel, three actuators 4a to 4c disposed in the foundation unit 2 and configured to drive the respective arms 10a to 10c, an attachment member (wrist shaft) 9 attached to the movable plate 3, a wrist actuator 5, a drive shaft 7 configured to transfer drive power of the wrist actuator 5 to the attachment member 9, a fixation member 6 fixing the wrist actuator 5 to the arm 10a, and an universal joint UJ provided halfway through the drive shaft 7.

The foundation unit 2 has a circular disk shape from which three substantially rectangular shapes are cut out to avoid contact with the three arms 10a to 10c. The three arms 10a to 10c are disposed at equal intervals in the circumferential direction about a perpendicular axis passing through the center of the circular disk of the foundation unit 2.

The actuators 4a to 4c and the wrist actuator 5 each include a servomotor and a decelerator. The actuators 4a to 4c swing the respective arms 10a to 10c coupled therewith about horizontal axes aligned with the direction of the plane of the foundation unit 2 in the circular disk shape.

The position of the movable plate 3 is controlled by controlling drive of the actuators 4a to 4c. The actuators 4a to 4c can translate the movable plate 3 while maintaining the posture of the movable plate 3 in parallel to the foundation unit 2. The wrist actuator 5 rotates the attachment member 9 about the central axis of the circular disk of the movable plate through the drive shaft 7. When the wrist actuator 5 is controlled, the rotation angle of the attachment member 9 relative to the movable plate 3 is controlled, and the rotation angle of an end effector (not illustrated) attached to the attachment member 9 is controlled.

The arms 10a to 10c have identical configurations, and thus, the following description will be made on the arm 10a, but description of the arms 10b and 10c will be omitted. The arm 10a includes a drive link 11a having one end attached to the actuator 4a, and a passive link (link) 15a having one end swingably connected with the other end of the drive link 11a. The other end of the passive link is swingably connected with the movable plate 3.

The passive link 15a includes two link members 12a and 13a parallel to each other. The link members 12a and 13a each have both ends swingably connected with the drive link 11a and the movable plate 3 through ball joints (joints) BJ. In other words, the drive link 11a, the movable plate 3, and the two link members 12a and 13a constitute a parallel four-joint link. With this configuration, a rectangle connecting the four ball joints BJ with straight lines is constantly shaped in a parallelogram when the parallel four-joint link changes an angle relative to the drive link 11a.

Figure 2:
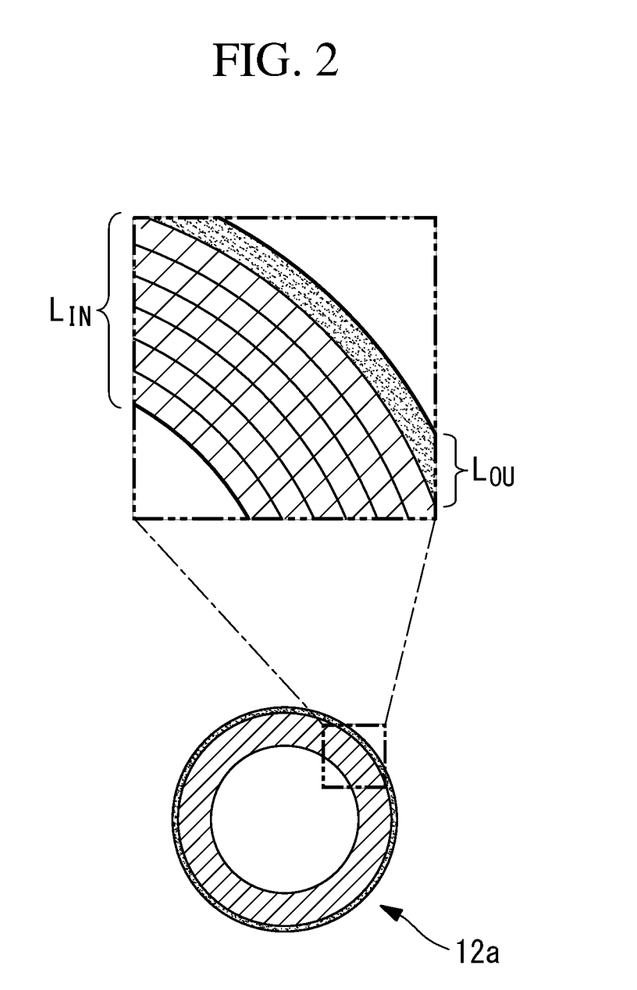
FIG. 2 is an enlarged view illustrating section A-A of the parallel link robot illustrated in FIG. 1.

The link members 12a to 12c and 13a to 13c have identical structures, and each have a cylindrical shape over the length. FIG. 2 illustrates a transverse sectional shape of the link member 12a and an enlarged sectional shape of part thereof. As illustrated in FIG. 2, the link member 12a includes an inner layer $L_{IN}$ as a stack of a plurality of layers made of carbon fiber reinforced plastic (hereinafter referred to as CFRP), and an outer layer $L_{OU}$ made of nitrile rubber (hereinafter referred to as NBR) and covering the inner layer $L_{IN}$ over the entire circumference.

The inner layer $L_{IN}$ is formed by winding sheet CFRP around the outer peripheral surface of a round bar. The outer layer $L_{OU}$ is formed integrally with the inner layer $L_{IN}$ by winding sheet NBR to cover the surface of the inner layer $L_{IN}$ after the inner layer $L_{IN}$ is formed. After the outer layer $L_{OU}$ is formed, the round bar is pulled out to leave a hollow part in the link member 12a when completed. In the link member 12a according to the present embodiment, the inner layer $L_{IN}$ is covered by the outer layer $L_{OU}$ in a substantially entire range in the longitudinal direction.

Figure 3:
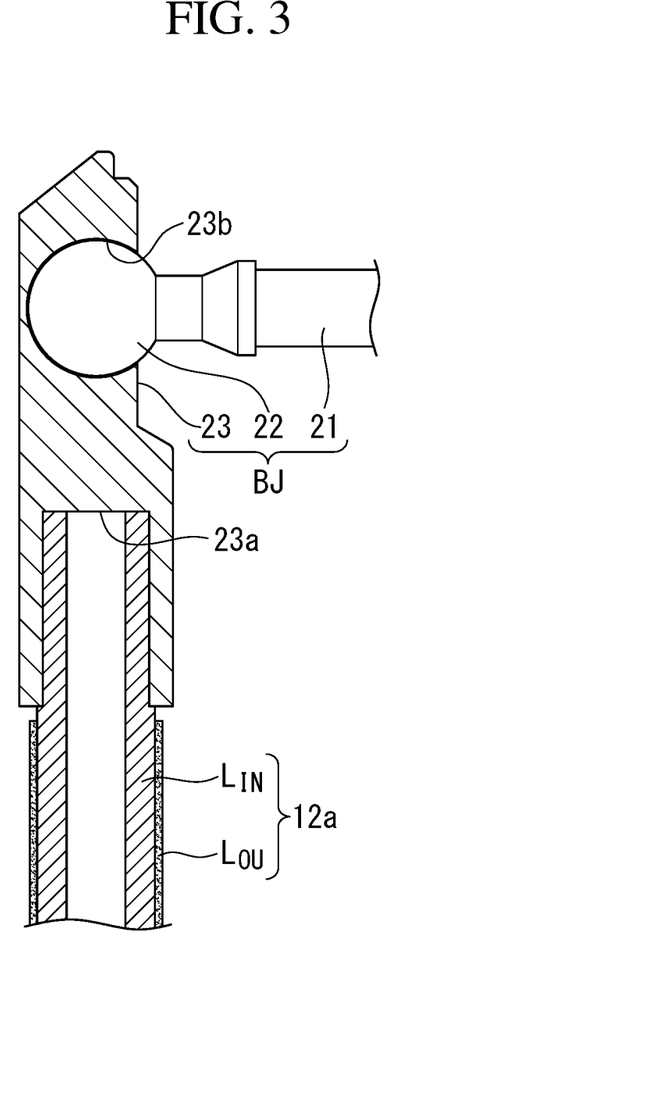
FIG. 3 is an enlarged longitudinal sectional view illustrating a ball joint included in the parallel link robot illustrated in FIG. 1 and the vicinity thereof.

FIG. 3 illustrates a longitudinal sectional view indicating the relation between the inner layer $L_{IN}$ and the outer layer $L_{OU}$ in the vicinity of one of the ball joints BJ. The ball joint BJ illustrated in FIG. 3 couples the drive link 11a and the link member 12a. As illustrated in FIG. 3, the ball joint BJ includes a spherical ball head 22, a substantially cylindrical ball stud 21 coupled with the drive link 11a and connected with the ball head 22, a reception portion 23b having an inner spherical surface complementary with the spherical surface of the ball head 22, and a coupling portion 23 including an insertion hole 23a engaged with the link member 12a.

The posture of the link member 12a coupled with the coupling portion 23 can be optionally changed relative to the drive link 11a by relatively sliding the ball head 22 and the reception portion 23b.

Both ends of the link member 12a are each formed into a cylindrical shape by accurately fabricating, by lathe turning or the like, the outer peripheral surface of the inner layer $L_{IN}$ exposed by partially peeling off the outer layer $L_{OU}$, and are each engaged with the insertion hole 23a of the coupling portion 23. In other words, in each of the link member 12a and the other link members 12b, 12c, and 13a to 13c, the inner layer $L_{IN}$ is covered by the outer layer $L_{OU}$ in a region except for both ends in the longitudinal direction.

Figure 4:
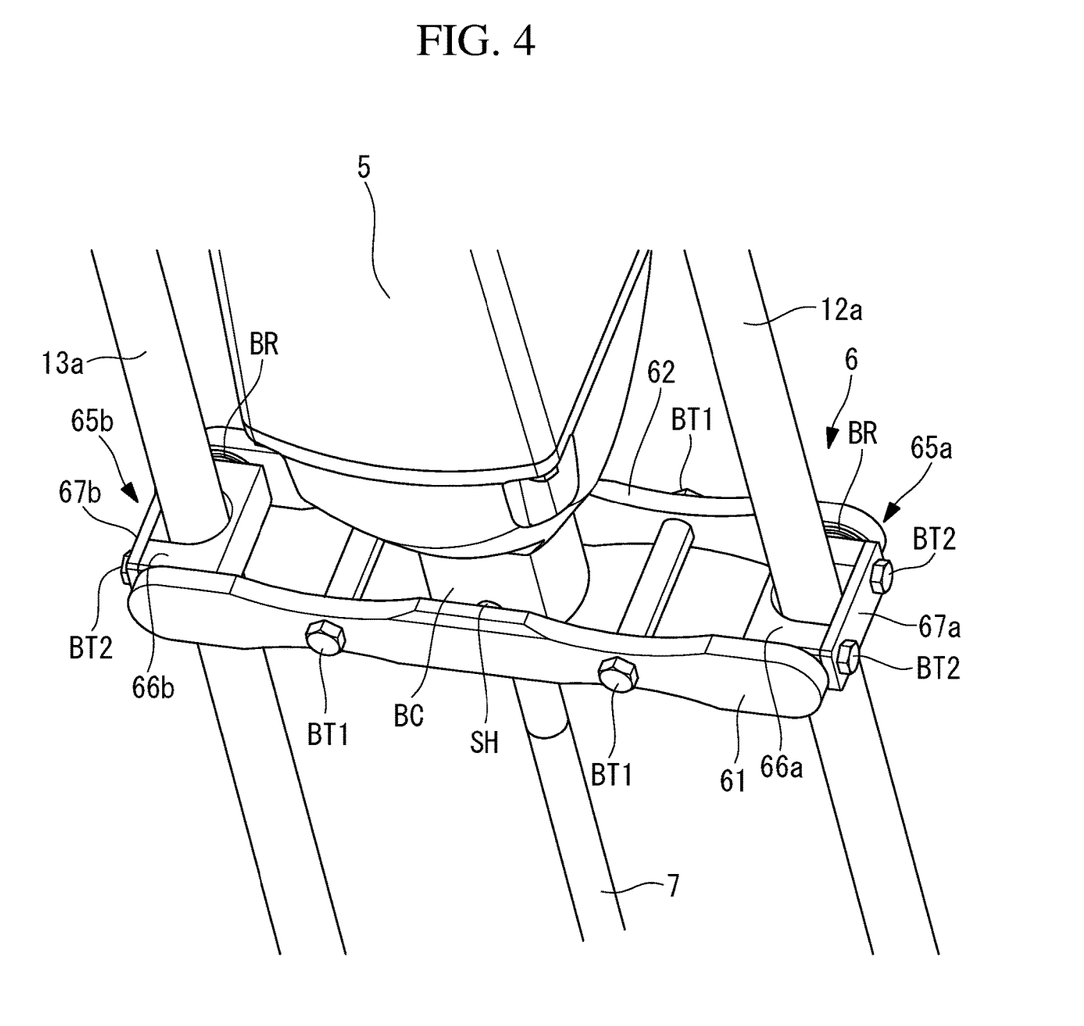
FIG. 4 is an enlarged perspective view illustrating a fixation member included in the parallel link robot illustrated in FIG. 1 and the vicinity thereof.

FIG. 4 is an enlarged perspective view illustrating the fixation member 6 and the vicinity thereof. As illustrated in FIG. 4, the fixation member 6 includes two long plate members 61 and 62 fixed in parallel separately from each other by two pairs of bolts BT1 and separation members, and two clamp components 65a and 65b disposed between the long plate members 61 and 62 and mounted on the respective link members 12a and 13a.

The clamp component 65a includes a metallic recess member 66a including a recess engaged with the link member 12a, a metallic flat plate member 67a disposed on a side opposite to the recess member 66a with respect to the link member 12a engaged with the recess, and a bolt BT2 fixing the flat plate member 67a and the recess member 66a to the link member 12a by clamping.

The flat plate member 67a is provided with a through-hole through which the bolt BT2 penetrates. The recess member 66a is provided with a screw hole for fastening the bolt BT2 penetrating through the through-hole of the flat plate member 67a. The clamp component 65b has a configuration same as that of the clamp component 65a, and thus description thereof will be omitted.

A bracket BC provided at a tip of the wrist actuator 5 is disposed between the two long plate members 61 and 62 of the fixation member 6 and at the center in the longitudinal direction of the long plate members 61 and 62. The recess members 66a and 66b of the clamp components 65a and 65b and the bracket BC are provided with a shaft SH extending, in the direction of separation, from two facing side surfaces of the long plate members 61 and 62 (shafts of the recess members 66a and 66b are not illustrated). The long plate members 61 and 62 are provided with bearings BR including inner rings engaged with the shaft SH and rotatably supporting the recess members 66a and 66b and the bracket BC (the bearings BR for the bracket BC are not illustrated). Each bearing BR may be a ball bearing or a slipping bearing.

In the parallel link robot 1 according to the present embodiment thus configured, when the link member 12a is clamped by the clamp component 65a with clamping force applied toward inside from outside in the radial direction, the outer layer $L_{OU}$ made of NBR elastically deforms to disperse the clamping force, thereby protecting the CFRP of the inner layer $L_{IN}$. Accordingly, the metallic clamp component 65a can be directly attached to the link member 12a made of CFRP to achieve a reduced weight, which eliminates the need to separately provide a protection component made of elastic material between the link member 12a and each of opposing surfaces of the recess member 66a and the flat plate member 67a, thereby reducing the number of components. This leads to reduction of manufacturing cost of the robot and lowers the risk that when the clamp component comes off, the clamp component 65a, particularly, a component made of NBR, which is difficult to sense, is mixed into an object handled by the robot.

The embodiment above exemplarily describes the link members 12a to 12c and 13a to 13c each including the inner layer $L_{IN}$ made of CFRP and the outer layer $L_{OU}$ made of elastic material, but the configurations of the link members 12a to 12c and 13a to 13c may be modified in various manners.

For example, in the above-described embodiment, the link members 12a to 12c and 13a to 13c each include the inner layer $L_{IN}$ made of CFRP and the outer layer $L_{OU}$ made of NBR, but the link members 12a and 13a to which the clamp components 65a and 65b are attached may each include the outer layer $L_{OU}$ made of NRB, and the other link members 12b, 12c, 13b, and 13c may include no layer made of NRB. In each of the link members 12a and 13a, the outer layer $L_{OU}$ only needs to be formed in a range in which the clamp components 65a and 65b are attached. No outer layer $L_{OU}$ made of elastic material needs to be formed not only in the coupling portion for the ball joint BJ in the above-described embodiment but also in, for example, a part between the fixation member 6 and the ball joint BJ.

The elastic material of which the outer layer $L_{OU}$ is formed may be rubber material other than NBR or may be elastic material such as resin. Examples of the rubber material of which the outer layer $L_{OU}$ is formed include hydrogen nitrile rubber (HNBR), chloroprene rubber (CR), fluorine rubber, and silicone rubber. Examples of the resin material of which the outer layer $L_{OU}$ is formed include polyacetal (POM) and ultrahigh molecular weight polyethylene (UHMW-PE). In the above-described embodiment, the link members 12a to 12c and 13a to 13c each include the inner layer $L_{IN}$ made of CFRP and the outer layer $L_{OU}$ made of NBR, but may each include a layer made of another material on the inner side of the inner layer $L_{IN}$ or between the inner layer $L_{IN}$ and the outer layer $L_{OU}$.

Figure 5:
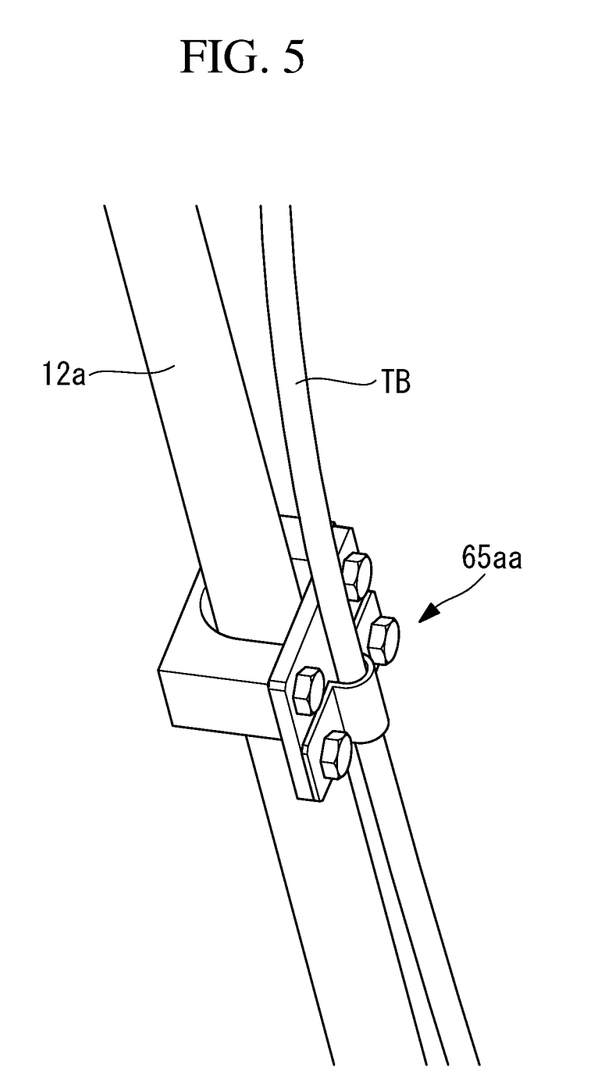
FIG. 5 is an enlarged perspective view illustrating a clamp component included in a parallel link robot according to a modification and the vicinity thereof.

In the above-described embodiment, the wrist actuator 5 is fixed to the link member 12a or the like by the fixation member 6 including the clamp components 65a and 65b, but, for example, a tube TB as another component may be fixed to the link member 12a or the like by a clamp component 65aa as illustrated in FIG. 5. In the configuration illustrated in FIG. 5, the tube TB is fixed to the link member 12a, but no clamp component 65b is mounted on the link member 13a (not illustrated).

In the above-described embodiment and the configuration illustrated in FIG. 5, the clamp components 65a, 65b, and 65aa are exemplarily described as components that apply clamping force to the link members 12a and 13a in the direction intersect to the longitudinal direction from outside in the radial direction, but other components (for example, clips) are applicable.

When another component is fixed to the link member 12a, the outer layer $L_{OU}$ provided over the length of the link member 12a allows a user to fix the tube TB or the like at an optional position by using the metallic clamp component 65aa. Alternatively, the outer layer $L_{OU}$ may be partially provided only at a predetermined position on the link member 12a in the longitudinal direction, and the tube TB or the like may be fixed at the position by the clamp component 65aa.

In the above-described embodiment, what is called a delta-type parallel link robot including the three arms 10a to 10c is exemplarily described as a robot including the link members 12a to 12c and 13a to 13c in each of which the inner layer $L_{IN}$ made of CFRP and the outer layer $L_{OU}$ made of elastic material are formed, but the present invention is also applicable to other robots. For example, the present invention is applicable to a parallel link robot including four or more arms or two arms and a serial link robot including no parallel arms.

From the above-described embodiments and modifications thereof, the present invention provides the following solutions.

A robot according to an aspect of the present invention includes at least one joint, and at least two links coupled with each other by the joint. At least one of the links includes an inner layer made of carbon fiber reinforced plastic, and an outer layer made of elastic material and covering an outer peripheral surface of at least part of the inner layer in a longitudinal direction over an entire circumference, the layers being integrally stacked.

According to the present aspect, each link includes the inner layer made of carbon fiber reinforced plastic, and thus and has light weight and high tensile strength. In addition, at least part of the inner layer is covered by the outer layer made of elastic material. With this configuration, when another component such as a cable is fixed to the part through, for example, a metallic clamp component, the outer layer protects the inner layer from damage, and the outer layer elastically deforms to disperse surface pressure applied on the inner layer by the clamp component.

Accordingly, damage on the inner layer, which is made of carbon fiber reinforced plastic and has light weight and high tensile strength, can be reduced by protecting the inner layer from a load in the direction intersecting the longitudinal direction, such as clamping force when another component such as a clamp component is mounted. Moreover, reduction of the number of components, which is achieved by integrally stacking the inner layer and the outer layer improves assembly easiness of the robot and reduces manufacturing cost of the robot.

A parallel link robot according to another aspect of the present invention includes: a foundation unit; a movable unit; a plurality of arms coupling the foundation unit and the movable unit in parallel; and a plurality of actuators disposed in the foundation unit and configured to drive the respective arms. Each arm includes a drive link driven by the actuator, and a passive link coupled with the drive link by a joint. Each passive link includes two link members parallel to each other. At least one of the link members includes an inner layer made of carbon fiber reinforced plastic, and an outer layer made of elastic material and covering an outer peripheral surface of at least part of the inner layer in a longitudinal direction over an entire circumference, the layers being integrally stacked.

In the present aspect, since the passive link includes the two link members, each link member is thin in some cases. However, in a link member in which the inner layer and the outer layer are stacked, the inner layer is made of carbon fiber reinforced plastic, and thus the link member has high tensile strength. In addition, since the outer layer of the link member is made of elastic material, mounting a clamp component or the like on the link member causes no damage on the inner layer, and surface pressure applied on the inner layer is dispersed.

Accordingly, damage on the inner layer can be reduced by protecting the inner layer from a load in the direction intersecting the longitudinal direction. Moreover, reduction of the number of components, which is achieved by integrally stacking the inner layer and the outer layer improves assembly easiness of the robot and reduces manufacturing cost of the robot.

In the above-described aspect, the link member other than the link member having a stack structure may be made of carbon fiber reinforced plastic.

With this configuration, a link member on which a clamp component or the like is not mounted does not need to include an outer layer made of elastic material, which leads to reduction of manufacturing cost of the robot.

In the above-described aspect, each link member may include the inner layer and the outer layer integrally stacked.

With this configuration, mounting a clamp component or the like on any of the link members causes no damage on the CFRP of the inner layer. This improves freedom in selection of the mounting position of another component such as a cable mounted through the clamp component. The same link member can be used as all link members, which leads to improved freedom of designing and reduction of manufacturing cost of the robot.

In the above-described aspect, the outer layer may cover an entire outer peripheral surface of the inner layer.

With this configuration, mounting a clamp component or the like at any position on a link member in the longitudinal direction causes no damage on the CFRP of the inner layer. This improves freedom in selection of mounting position of another component such as a cable mounted through the clamp component.

In the above-described aspect, the parallel link robot may include a wrist shaft attached to the movable unit, and a wrist actuator configured to drive the wrist shaft, and the wrist actuator may be attached to a fixation member fixed to each link member from an outer surface of the outer layer.

With this configuration, when the wrist actuator configured to drive the wrist shaft is fixed to each link member through the fixation member, the outer layer protects the inner layer from a load applied by the fixation member in the direction intersect to the longitudinal direction of the link member. Moreover, reduction of the number of components of the parallel link robot improves assembly easiness of the parallel link robot and reduces manufacturing cost of the parallel link robot.

Advantageous Effects of Invention

According to the present invention, an inner layer made of carbon fiber reinforced plastic is protected from a load in a direction intersecting the longitudinal direction to reduce damage thereon. Moreover, reduction of the number of components, which is achieved by integrally stacking the inner layer and an outer layer improves assembly easiness of a robot and reduces manufacturing cost of the robot.

The invention claimed is:

1. A robot comprising:
a first link directly coupled with a second link by a joint, wherein the first link comprises:
   a first link member;
   a second link member; and
   a fixation member,
wherein the fixation member is directly attached to the first link member and directly attached to the second link member,
wherein at least one of the first and second link members includes a combination of an inner layer made of carbon fiber reinforced plastic, and an outer layer made of elastic material and covering an outer peripheral surface of at least part of the inner layer in a longitudinal direction over an entire circumference, and
wherein the inner layer and outer layer are integrally stacked,
wherein the outer layer covers only a predetermined portion of the inner layer, and the fixation member is attached to an entire circumference of the outer layer on the predetermined portion, and
wherein the first and second link members, other than the predetermined portion, are made of carbon fiber reinforced plastic.

2. The robot of claim 1, wherein the fixation member includes at least one clamp, the at least one clamp is configured to apply a clamping force to the first and second link members in a direction intersect to the longitudinal direction from outside in a radial direction.

3. A parallel link robot comprising:
a foundation unit;
a movable unit;
a plurality of arms coupling the foundation unit and the movable unit in parallel;
a plurality of actuators disposed in the foundation unit and configured to drive the plurality of arms, respectively; and
a fixation member,
wherein
each arm in the plurality of arms includes a drive link driven by an actuator in the plurality of actuators, and a passive link directly coupled with the drive link by a joint,
each passive link includes two link members parallel to each other, wherein the two link members comprise a first link member and a second link member,
the fixation member is directly attached to the first link member and the second link member,
the two link members to which the fixation member is directly attached include an inner layer made of carbon fiber reinforced plastic, and an outer layer made of elastic material and covering an outer peripheral surface of at least part of the inner layer in a longitudinal direction over an entire circumference, and
the inner layer and the outer are integrally stacked,
wherein the outer layer covers only a predetermined portion of the inner layer, and the fixation member is attached to an entire circumference of the outer layer on the predetermined portion, and
wherein the first and second link members, other than the predetermined portion, are made of carbon fiber reinforced plastic.

4. The parallel link robot according to claim 3, wherein the outer layer covers an entire outer peripheral surface of the inner layer.

5. The parallel link robot of claim 2, wherein the fixation member includes at least one clamp, the at least one clamp is configured to apply a clamping force to the first and second link members in a direction intersect to the longitudinal direction from outside in a radial direction.

6. A parallel link robot comprising:
a foundation unit;
a movable unit;
a plurality of arms coupling the foundation unit and the movable unit in parallel;
a plurality of actuators disposed in the foundation unit and configured to drive the plurality of arms, respectively;
a fixation member,
a wrist shaft directly attached to the movable unit; and
a wrist actuator configured to drive the wrist shaft,
wherein
each arm in the plurality of arms includes a drive link driven by an actuator in the plurality of actuators, and a passive link directly coupled with the drive link by a joint,
each passive link includes two link members parallel to each other,
the fixation member is directly attached to both of the two link members of the passive link of one of the plurality of arms,
each of the two link members to which the fixation member is directly attached includes an inner layer made of carbon fiber reinforced plastic, and an outer layer made of elastic material and covering an outer peripheral surface of at least part of the inner layer in a longitudinal direction over an entire circumference,
the inner layer and the outer are integrally stacked,
the wrist actuator is directly attached to the fixation member, and
the fixation member is directly attached to each link member from an outer surface of the outer layer of each of the two linking members to which the fixation member is directly attached,
wherein the outer layer covers only a predetermined portion of the inner layer, and the fixation member is attached to an entire circumference of the outer layer on the predetermined portion, and
wherein the two link members, other than the predetermined portion, are made of carbon fiber reinforced plastic.

7. The parallel link robot according to claim 6, wherein the outer layer covers an entire outer peripheral surface of the inner layer.

8. The parallel link robot of claim 6, wherein the fixation member includes at least one clamp, the at least one clamp is configured to apply a clamping force to the first and second link members in a direction intersect to the longitudinal direction from outside in a radial direction.

* * * * *